United States Patent Office 3,375,675
Patented Apr. 2, 1968

3,375,675
LOW TEMPERATURE REFRIGERATING APPARATUS
Christian Trepp, Winterthur, and Sahabettin Ergenc, Zollikerberg, Zurich, Switzerland, assignors to Sulzer Brothers Limited, Winterthur, Switzerland, a Swiss company
Filed July 7, 1966, Ser. No. 563,541
Claims priority, application Switzerland, July 16, 1965, 10,000/65
4 Claims. (Cl. 62—45)

ABSTRACT OF THE DISCLOSURE

There is disclosed a low temperature refrigeration plant comprising a pressure vessel containing a charge of gaseous helium under pressure, a closed cycle refrigeration apparatus for abstracting heat from that charge, and a closed cycle pumping circuit for pumping a heat exchange medium between that vessel (or a coil in heat exchange relation with that vessel) and a refrigeration load. This circuit is charged with liquid hydrogen and is provided with a vertically extending column having a vapor space at the top having gaseous helium therein. The pressure vessel is also disclosed as constituting part of a helium liquefaction plant.

---

The present invention relates to cryogenic apparatus and more particularly to apparatus for removal, at low temperatures, of heat from a device to be held at low temperature, and in which device the heat to be removed is generated during spaced periods of time which are short compared to their time separation. The invention provides apparatus of this character employing as a refrigerant storage or "store of cold" a pressure vessel filled with gaseous helium which is continuously cooled. This vessel with its filling will hereinafter be referred to as a cryogenic store.

The invention finds particular application in cooling to low temperatures intermittently operated electromagnets which may be employed for the production of high field strengths. It is common practice in the carrying out of physical experiments to operate such magnets for short time periods only, for example for periods of one or several minutes, whereas the time intervals between these periods of operation may be of the order of magnitude of one or more hours.

It is an object of the invention to provide a desirable form of continuously operable apparatus for development of the required cryogenic output. According to the invention the cryogenic store is directly connected to a gas refrigeration plant operating with helium as refrigerant, with a heat transfer device of the refrigeration plant disposed within the cryogenic store for transfer of heat from the helium of the cryogenic store to the refrigeration plant.

Because of the transfer of heat occurring directly to a heat transfer device or unit of the refrigeration plant disposed within the cryogenic store, the apparatus of the invention does not require a pump for circulation of the gas of the cryogenic store through an external heat transfer device disposed in the refrigeration plant. Such a pump represents not only increased constructional cost but also a seat of possible malfunctions and a source of heat leakage into the apparatus.

In the apparatus of the invention the heat transfer device within the cryogenic store is desirably connected into a gas refrigeration plant of closed cycle type, at a point downstream of the expansion machine of that plant (which machine may be an expansion turbine) and which machine is operated at the lowest temperature prevailing in the plant.

According to another advantageous feature of the invention, the refrigeration plant is operated under supercharged condition, i.e. with the lowest pressure greater than one atmosphere, a buffer vessel being connected through regulating valves in a by-pass between the low and high pressure sides of the compressor of that plant. In this way the suction pressure of the compressor can be held to a constant value even with changes in the lowest temperature achieved in the plant, so that the compressor ouput can be held substantially constant.

The invention will now be further described in terms of a number of exemplary embodiments thereof and with reference to the accompanying drawings wherein.

Figure 1:
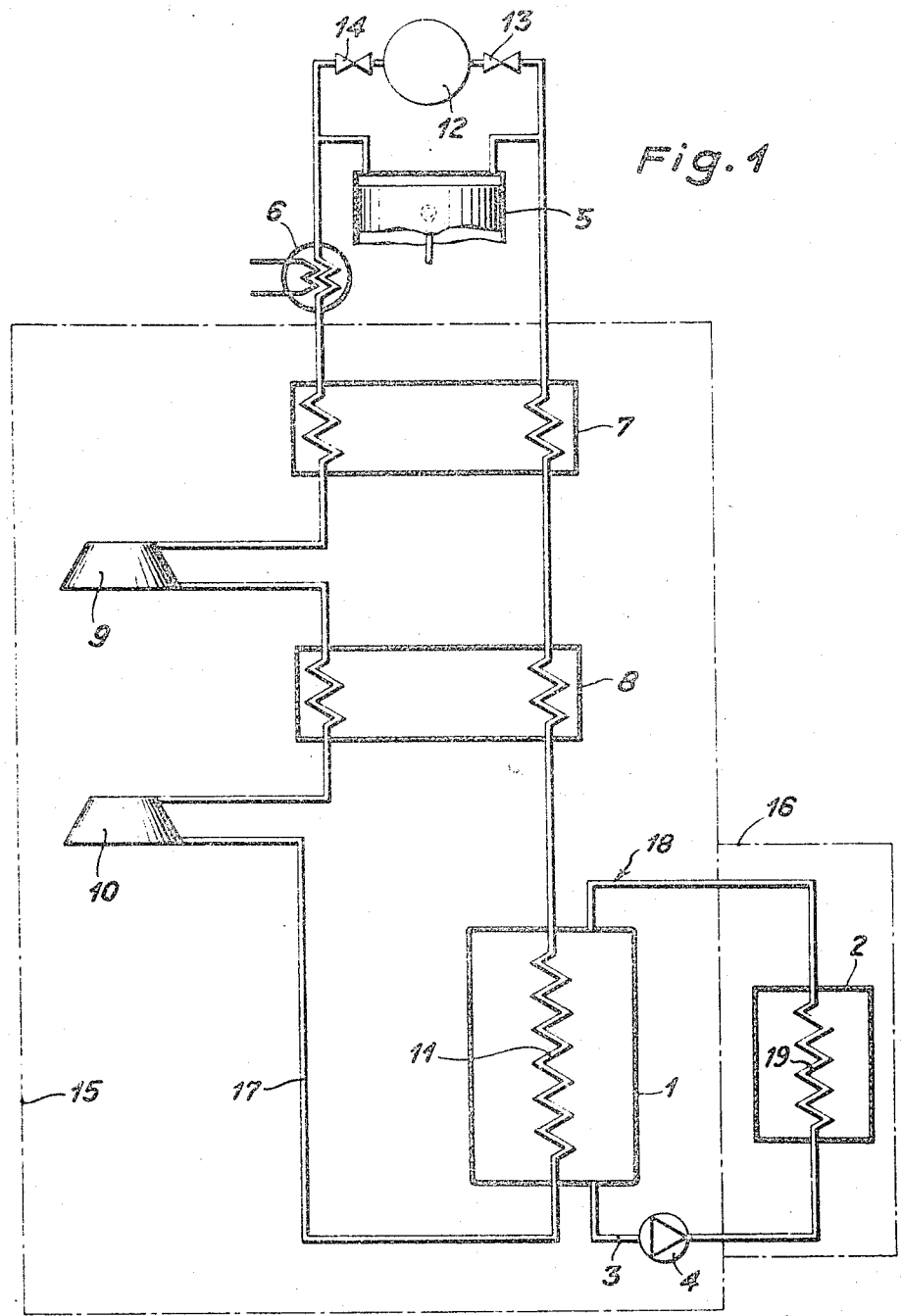
FIG. 1 is a schematic diagram of one embodiment of the invention including a refrigeration plant employing a gaseous refrigerant, a cryogenic store, and, connected to that store, the cooling system of an intermittently operated refrigeration load.

In the embodiment of FIG. 1 a continuously operated refrigeration plant employing a gaseous refrigerant, namely helium, serves to cool helium gas compressed to a high pressure of for example 30 atmospheres in the pressure vessel 1. The vessel 1 with its charge of compressed helium constitutes, in the embodiment of FIG. 1, the "cryogenic store" previously referred to.

With a mean temperature of from 10° K. to 12° K. for the gas in the vessel 1, the density of that gas is approximately that of liquid helium. Hence heating of that gas through even a few degrees requires a substantial amount of heat. Thus this gas can be considered to have a relatively large cooling capacity even if prevented from rising more than a few degrees in temperature, i.e. even at very low temperatures.

This capacity is employed to absorb heat intermittently generated in or introduced into a load 2, for example a magnet. During the operating times of the load 2, i.e. during the times when heat is being liberated there, helium is forced by means of a pump 4 through that load via a line 3 connected to withdraw helium from the lower end of the vessel 1. After passing through the load 2 this helium is returned to the upper end of the vessel 1. The helium pumped by pump 4 thus flows in a closed circuit, generally indicated at 18, which includes the vessel 1, line 3, pump 4, a cooling surface 19 in the load 2, which surface may take the form of a coil, and a line connecting the warm end of coil 19 (the upper end thereof in FIG. 1) with the upper end of vessel 1.

The refrigeration plant serving to produce the required cryogenic output, i.e. to hold the helium in vessel 1 at the desired mean temperature despite absorption of heat thereby from load 2, comprises a compressor 5, a cooler 6 for dissipation of the heat of compressor 5, counterflow heat exchangers 7 and 8, two expansion turbines 9 and 10, and a heat transfer device 11 disposed within the vessel 1. The device 11 may take the form of a coil. A buffer vessel 12 is disposed in a by-pass to the compressor 5 and is connected via control valves 13 and 14 to the low and high pressure sides of the compressor respectively.

Means for insulation of the portions of the system below ambient temperature are shown schematically at 15 and 16. These means may comprise vacuum spaces held at pressures of the order of $10^{-4}$ mm. of mercury.

The refrigeration plant comprising elements 5 to 14 is continuously operated, as has already been indicated. In this operation helium compressed in the compressor 5 flows from the compressor into the cooler 6, where its heat of compression is removed therefrom. The compressed helium, flowing downwardly in the diagrammatic showing of FIG. 1, is then cooled below ambient temperature in the heat exchanger 7 by means of helium (shown flowing upwardly in FIG. 1) expanded to the suction side pressure of the compressor. The compressed helium so cooled in exchanger 7 is thereupon expanded with performance of external work in the expansion turbine 9 down to an intermediate pressure. It is thereby further cooled, and is then still further cooled in a heat exchanger 8 by heat exchange with previously expanded gas emerging from the coil 11. Lastly, it is further expanded in the turbine 10, in the process of which expansion the gas is cooled to the lowest temperature which it reaches in the system. The gas so cooled to the desired temperature then passes through the cooling coil or equivalent heat transfer unit 11 in the vessel 1 and in the process abstracts heat from the gaseous content of that vessel. The gas flowing through coil 11 then flows as a heat absorptive medium through the heat exchangers 8 and 7, being heated thereby substantially to ambient temperature before being returned to the suction side of the compressor. Reference character 17, applied to the line between the output end of turbine 10 and the input to the heat transfer surface 11, identifies the closed path or circuit in which flows the helium gas of the refrigeration plant. This cycle is to be distinguished from the closed cycle, indicated at 18, including line 3, pump 4, heat transfer surface 19 in exchanger 2, and the vessel 1 through which flows the highly compressed helium and whose average temperature is, in the example above suggested, some 10° K. or 12° K.

With increasing cooling of the gaseous content of the vessel 1, i.e. of the gas in cycle 18, the exit temperature from the turbine 10 in cycle 17 declines. As is known, this leads to a decline in the cryogenic output, i.e. of the refrigeration effected. This reduced output is caused primarily by the reduced enthalpy difference available in the expansion turbines due to the decline in temperature there, and also by the reduced pressure at the low pressure side of the compressor which represents a reduced amount of compressor output. In a preferred embodiment of the invention the compressor output is held substantially constant by holding the pressure at the suction side thereof to a constant, preferably supraatmospheric value of, for example, two atmospheres or more, irrespective of temperature. To this end, in the case of declining temperature in the system, gas is supplied to the low pressure side of the compressor from the buffer vessel 12. In contrast, in the case of increasing temperature, i.e. during the periods in which heat is being evolved in the load 2, gas is withdrawn from the high pressure side of the compressor and stored in the buffer storage vessel 12.

In this process the control valves 13 and 14 are operated by means not shown in dependence on the pressure at the suction side of the compressor. The gaseous refrigeration system (whose cycle is indicated at 17 in FIG. 1) is made up in closed cycle form so that while not in operation, the gaseous charge thereof rests in the cycle, one or both of the control valves 13 and 14 being fully opened.

Figure 2:
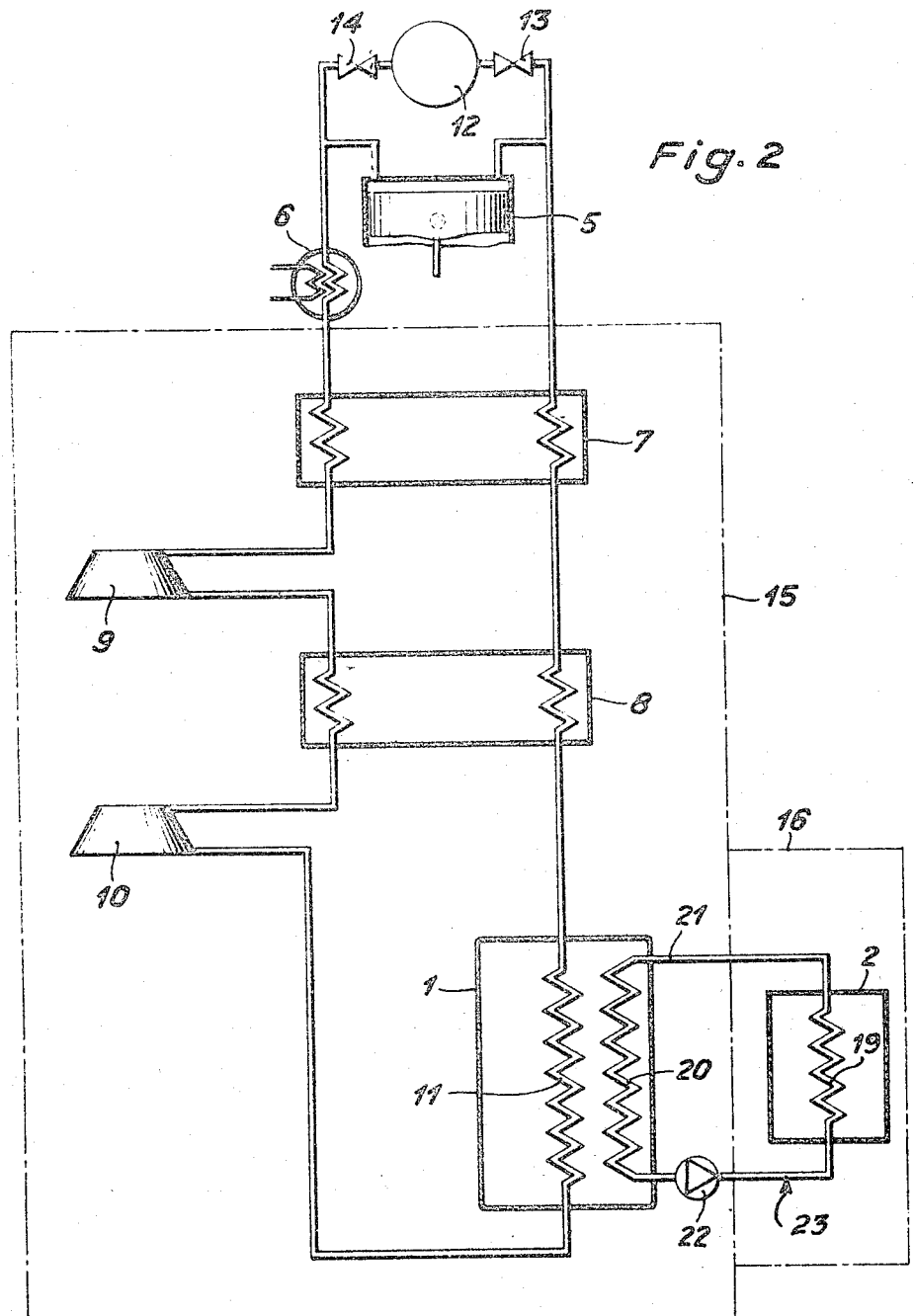
FIGS. 2 and 3 are smiilar diagrams showing embodiments having modified load cooling systems.
Figure 3:
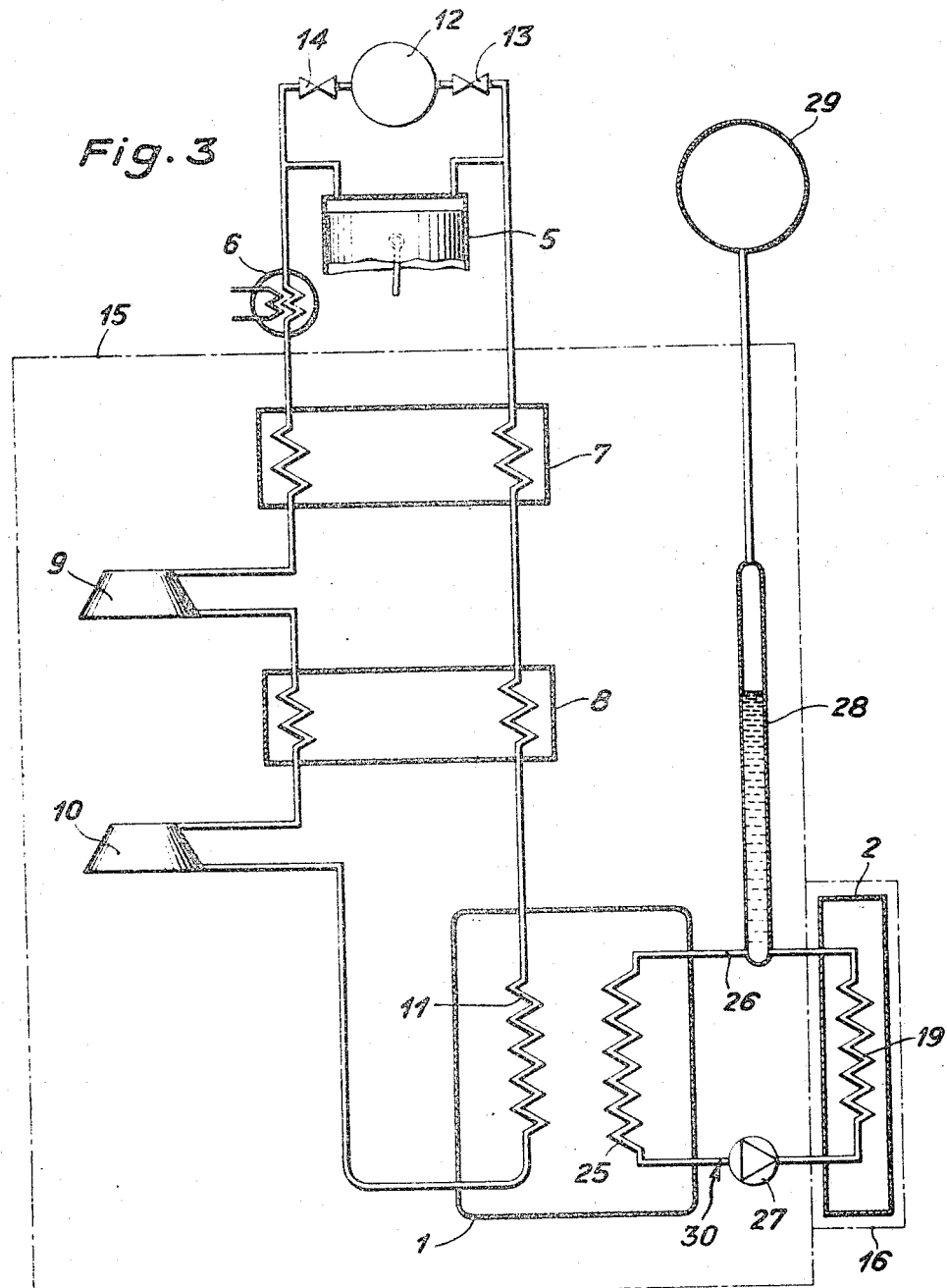
Figure 4:
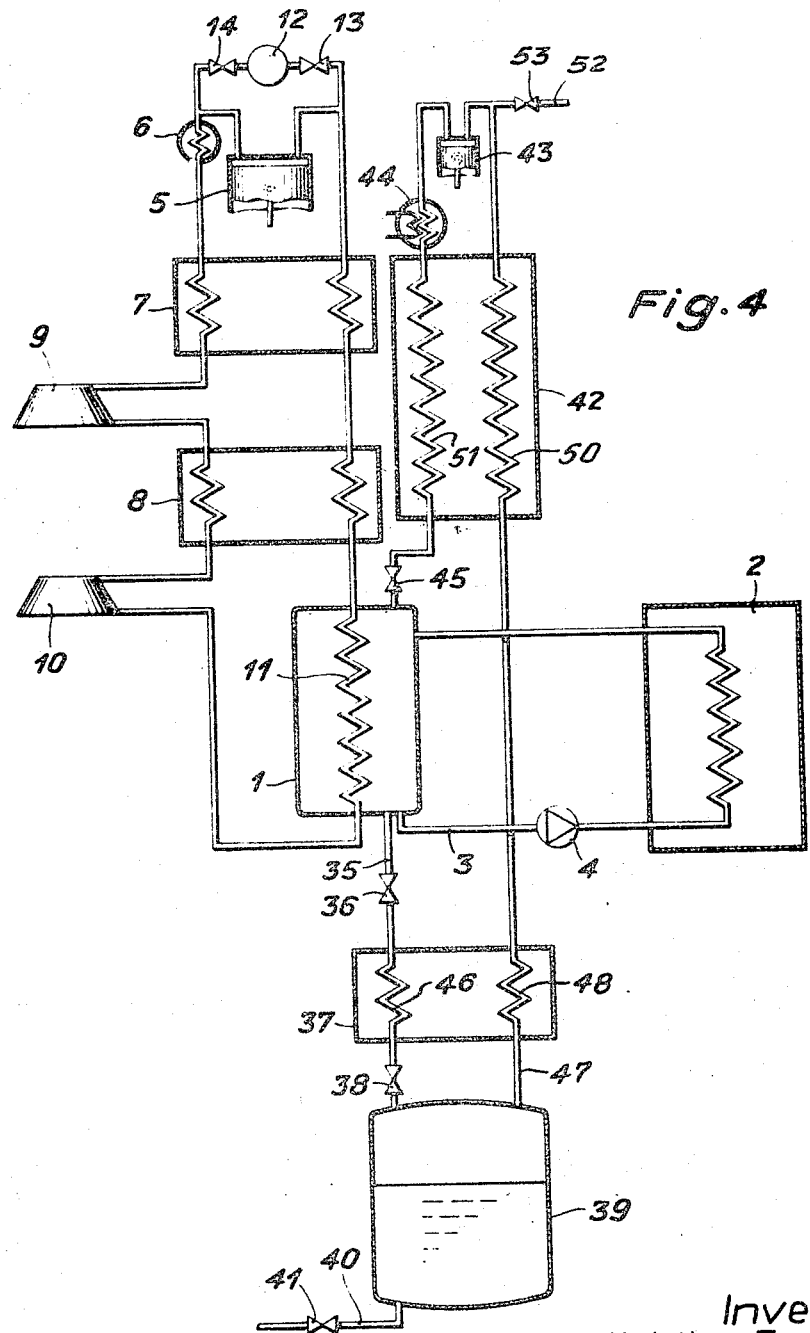
FIG. 4 is a schematic diagram similar to that of FIG. 1 but further showing connection to the cryogenic store of apparatus for the liquefaction of helium.

The elements of structure of the embodiments of the invention shown in FIGS. 2 to 4 which correspond in function with those of FIG. 1 bear the same reference characters.

Thus FIG. 2 shows an embodiment of the refrigeration circuit of the invention differing from that of FIG. 1 with respect to the load 2. In FIG. 2 a heat transfer device 20, which may take the form of a coil, is provided in the storage vessel 1. The coil 20 is connected in circuit with a heat transfer surface 19 in the load device 2 by means of a line 21 to form a closed circuit, generally indicated at 23, through which gaseous helium as refrigerant is circulated during periods of operation of the load 2 by means of a pump 22. The essential advantage of this embodiment resides in the fact that the pressure of the helium in the vessel 1 is independent of the pressure desired to be maintained in the load cooling system, i.e. in the circuit 23, and can consequently be selected at a correspondingly high level for the achievement of as large a cooling capacity as possible.

In the embodiment of the invention shown in FIG. 3, as in that of FIG. 2, a heat transfer unit 25, which may be similar to that shown at 20 in FIG. 2, is disposed in the cold storage vessel 1. This unit 25 is connected by means of a line 26 into a closed circuit generally indicated at 30, including the load cooling coil or equivalent device 19, and a pump 27 is provided to circulate the refrigerant through this circuit and therefore through the load 2. In this embodiment liquid hydrogen is used as the cooling medium in place of gaseous helium. If, as is often the case, it is desired to avoid vaporization of the hydrogen upon absorption of heat thereby from the load, it is necessary to circulate the hydrogen in subcooled condition through the refrigeration circuit 30. This can be achieved by providing a buffer in that circuit, for example downstream of the load 2. The buffer comprises a vertical column 28 which is partly filled with liquid hydrogen and the upper end of which is connected with a buffer vessel 29 at ambient temperature. The buffer vessel 29 contains a filling of gaseous hydrogen. By adjustment of the degree to which this buffer is filled, the desired range of pressure values may be established in the refrigeration circuit 30. In the event of an increase in heat in the hydrogen charge of cycle 30, produced by the evolution of heat in load 2, the temperature at the top of the liquid column 28 will rise, and the vapor pressure in the vessel 29 will change correspondingly, i.e. to correspond to the pressure in the cooling cycle 30. With a buffer charge such that, for example, the temperature at the upper end of the liquid hydrogen column is 21° K., the vapor pressure of the hydrogen in vessel 29 will be some 1.2 atmospheres absolute. The pressure of the sub-cooled liquid hydrogen in cycle 30 will thus also amount to 1.2 atmospheres absolute, corrected for the height of the liquid column. The hydrogen circulating through the refrigeration cycle 30 upon operation of the load, i.e. during the periods within which heat is being evolved in the load, may for example show during such operation a temperature of from 15° K. to 18° K. The liquid in the column 28 is therefore divided into layers of successively different temperatures.

The desired pressure above the supercooled liquid can also be maintained by filling the buffer vessel 29 with helium. In this case, the pressure in the refrigeration cycle 30 will correspond to the sum of the hydrogen vapor and helium gas pressures.

The particular advantages of a hydrogen-charged refrigeration cycle of the type just described reside in the fact that by reason of the large specific heat of hydrogen only a small quantity need be circulated. In addition, the large heat of vaporization of hydrogen is available as a "cold reserve" which can be employed to cool the load in the event of a malfunction such as pump failure, or which can be used directly to cool the load in the event that a vaporization of the refrigeration medium due to evolution of heat in the load can be accepted during normal operation. As in the embodiment shown in FIG. 2, the pressure in the refrigeration cycle 30 is moreover independent of the pressure of the helium gas in the cold storage vessel 1.

The embodiment of FIG. 4 differs from that of FIG. 1 in that a system for the liquefaction of helium has been coupled to the cold storage vessel 1. Without such a liquefaction system, in the event of plant shut-down for long periods the gaseous content of the cold storage vessel is pumped off either into pressure flasks or into a gasholder. This means however that the "cold" stored in that gas will be lost. Consequently, according to a further advantageous feature of the invention, the helium of the cold storage vessel is partly liquefied during time of plant shut-down so as to be available for another use.

The liquefaction plant for this purpose presently to be described can of course be applied to the cold storage vessels of the embodiments of the invention of FIGS. 2 and 3.

Referring again to FIG. 4, when the plant is shut down, helium is withdrawn from the cold storage vessel 1 via a line 35. It is then expanded to an intermediate pressure through a throttling device 36. It is then cooled in one side 46 of a counterflow heat exchanger 37 and further expanded down to liquefaction pressure in a throttling device 38. Liquid helium may be withdrawn from a collection vessel 39 through a conduit 40 provided with a shut-off valve 41. In the event of a large demand for liquid helium, the gaseous helium withdrawn from the vessel 39 through line 47 may, after passage through the second side 48 of exchanger 37 (where it absorbs heat from helium flowing through side 46), be heated at one side 50 of the counterflow heat exchanger 42 up to ambient temperature and delivered to the suction side of the compressor 43. After compression and dissipation of the heat of compression in a cooler 44, the gas delivered by this compressor is cooled at the other side 51 of heat exchanger 42 by heat exchange with the previously expanded gas flowing countercurrent in side 50 of heat exchanger 42. With the valve 45 open this cooled gas emerging from side 51 is then returned to the cold storage vessel 1. At the suction side of the compressor 43 there is provided a line 52 having a valve 53 for withdrawal of part of the helium raised to ambient temperature in order to avoid too sudden heating of the cold storage vessel 1.

While the invention has been described herein in terms of a number of presently preferred embodiments, the invention itself is not limited to the embodiments so described but rather comprehends all modification on and departures from those embodiments properly falling within the spirit and scope of the appended claims.

The invention thus provides a low temperature refrigeration apparatus for refrigeration of a load in which heat is discontinuously evolved. When the cooling requirement is periodic, it is undesirable to use a refrigerating plant with a capacity equal to the maximum energy release rate of the load. Instead it is more efficient to use the entire cycle time to generate and store refrigeration capacity which may then be used as needed. It is in this way that the average rate at which the refrigerating plant operates may be lower than the instantaneous rate at which heat is evolved in the load when that evolution occurs intermittently.

We claim:

1. Low temperature refrigeration apparatus for refrigeration of a load in which heat is discontinuously evolved, said apparatus comprising a pressure vessel, a charge of gaseous helium under supraatmospheric pressure within said vessel, means to permit the flow of heat from said load to said charge, a continuously operable refrigeration plant employing helium as refrigerant, said plant including a heat transfer device disposed within said vessel said apparatus further comprising means for the liquefaction of helium connected to said pressure vessel, said liquefaction means including first and second throttling means, a first counterflow heat exchanger, a liquid helium collection vessel, means connecting said pressure vessel through one of said throttling means, one side of said exchanger and the other of said throttling means in series to said collection vessel, and means connecting the vapor space of said collection vessel to the other side of said heat exchanger.

2. Apparatus according to claim 1 wherein said liquefaction means further comprise a compressor, an additional counterflow heat exchanger, means connecting the suction side of said compressor through one side of said additional heat exchanger to the said other side of said first heat exchanger, means connecting the high pressure side of said compressor through the other side of said additional heat exchanger to said pressure vessel, and means to withdraw helium from the suction side of said compressor.

3. Low temperature refrigeration apparatus for refrigeration of a load in which heat is discontinuously evolved said apparatus comprising a pressure vessel, a charge of gaseous helium under supraatmospheric pressure within said vessel, means to permit the flow of heat from said load to said charge, and a continuously operable refrigeration plant employing helium as refrigerant, said plant including a heat transfer device disposed within said vessel, said means to permit the flow of heat from said load to said charge including a heat transfer device in said load, a further heat transfer device within said pressure vessel, means connecting the heat transfer device in said load and said further heat transfer device into a closed cycle, a charge of liquid hydrogen in said cycle, means to circulate said hydrogen within said cycle, a column connected into said cycle, and means defining a closed vapor space at ambient temperature connected to said column.

4. Apparatus according to claim 3 including a charge of gaseous helium in said vapor space.

References Cited

UNITED STATES PATENTS

| | | | |
|---|---|---|---|
| 2,978,876 | 4/1961 | Pastuhou | 62—5 |
| 3,302,415 | 2/1967 | Royet | 62—5 |
| 3,302,416 | 2/1967 | Proctor et al. | 62—5 |
| 3,310,955 | 3/1967 | Snedon et al. | 62—5 |
| 3,125,863 | 3/1964 | Hood | 62—7 |
| 3,269,137 | 8/1966 | Hood | 62—40 |
| 3,313,117 | 4/1967 | Hood et al. | 62—46 |

LLOYD L. KING, *Primary Examiner.*